UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., G. M. B. H., OF FRANKFORT-ON-THE-MAIN, GERMANY.

MANUFACTURE OF ESTERS OF THE HYDROCINCHONA ALKALOIDS.

1,049,172. Specification of Letters Patent. Patented Dec. 31, 1912.

No Drawing. Original application filed December 23, 1911, Serial No. 667,447. Divided and this application filed June 18, 1912. Serial No. 704,408.

*To all whom it may concern:*

Be it known that I, HEINRICH THRON, a subject of the Emperor of Germany, and resident of Frankfort-on-the-Main, Germany, have invented certain new and useful Improvements in the Manufacture of Esters of the Hydrocinchona Alkaloids, of which the following is a specification.

I have succeeded in producing esters of hydro-cinchona-alkaloids such as hydroquinin, hydrocinchonin, hydrocinchonidin, hydrocuprein or hydroapoquinin, and the like, by means of organic acids, which esters are easily crystallizing and constitute tasteless bodies which are valuable medicaments.

According to this invention I cause, for instance, the chlorids, or the anhydrids, or the phenol esters, of the organic acids, of which it is desired to obtain the corresponding hydrocinchona-alkaloid esters, to react on the corresponding hydrocinchona-alkaloids; their salts, or their oxymagnesium haloid compounds, or I may start from the cinchona alkaloid esters and treat these with hydrogen in the presence of metals of the platinum group, or of colloidal solutions of these metals.

The hydrocinchona-alkaloid esters prepared according to this invention differ chemically from the known cinchona alkaloid esters in being much more stable toward potassium permanganate. In therapeutics they have, over the last named esters, the advantage that they contain, as active compounds, hydrocinchona-alkaloids which have specific medical actions. Compared with the free hydro-cinchona-alkaloids and salts thereof they have the advantage that they have no bitter taste.

The following examples illustrate the invention, but it is not limited to these examples. The parts are by weight.

*Example 1—Hydroquinin-ethyl-carbonate.*—10 parts of quinin-ethyl-carbonate are dissolved in 14 parts of twenty per cent. sulfuric acid and eighty parts of water and mixed with a solution of 0.1 part of colloidal palladium in 10 parts of water. Then the mixture is shaken with hydrogen at a pressure of 3 meters of water, until no more hydrogen is absorbed. The liquor is then mixed with ammonia in excess and the base is extracted with ether. The residue remaining on distilling off the ether is dissolved in one hundred parts of hot petroleum-benzin. On cooling the solution the hydroquinin-ethyl-carbonate crystallizes in fine colorless needles which melt at from 75° to 78° C. and are almost tasteless. They dissolve readily in alcohol, or chloroform, but are difficultly soluble in petroleum-benzin and water. This same product can also be produced by esterifying the hydroquinin according to the process more fully described in the parent application, of which the present application is a division.

*Example 2—Para-amino-benzoyl-hydroquinin.*—100 parts of para-amino-benzoyl-quinin are dissolved in 400 parts of water and 30 parts of sulfuric acid, 1 part of palladium black is added and the mixture is shaken with hydrogen until the gas ceases to be absorbed. Then the palladium is separated by filtration, the base precipitated with ammonia and recrystallization effected in a mixture of equal parts of benzene and petroleum benzin. The body thus obtained has the form of colorless and tasteless needles which melt at from 155°, to 157.5° centigrade and are readily soluble in alcohol or chloroform but difficultly soluble in petroleum-benzin and water.

*Example 3—Hydro-cinchonin-ethyl-carbonate.*—30 parts of cinchonin-ethyl-carbonate are dissolved in 160 parts of alcohol; the mixture is mixed with a solution of 0.1 part of colloidal palladium in 60 parts of water and shaken with hydrogen at a pressure of a few meters of water until the volume of the hydrogen no longer decreases. The greater part of the alcohol is then distilled off, and the residue is dissolved in dilute sulfuric acid so that the palladium is precipitated. The mass is filtered and the filtrate mixed with ammonia in excess and the base is absorbed in ether. After distilling off the ether the mass is dissolved in dilute alcohol out of which the hydrocinchonin-ethyl-carbonate crystallizes in fine, colorless and tasteless needles which melt at 134° centigrade. It is readily soluble in alcohol, or chloroform, but is difficultly soluble in petroleum-benzin and water. In sulfuric acid solution it is, in contradistinction to cinchonin-ethyl-carbonate, stable toward potassium permanganate.

Other products than those above mentioned can also be produced either by esterifying the corresponding hydrocinchona alkaloids, or by hydrogenizing the corresponding cinchona alkaloid esters. Thus the hydroquinin carbonate and the ethyl-hydrocuprein-ethyl-carbonate can be produced, for example, according to the process more fully described and illustrated by specific examples in the parent application Serial No. 667,447 of which the present application is a division.

The hydroquinin carbonate is a colorless and almost tasteless powder, readily soluble in alcohol and chloroform, but difficultly soluble in petroleum-benzin and water. It forms a yellow herapathite and is stable against permanganate in acid solution. Its acid sulfate salt crystallizes in needle-shaped crystals which are readily soluble in water, but difficultly soluble in alcohol.

The ethyl-hydrocuprein-ethyl-carbonate forms a colorless powder which is readily soluble in alcohol and chloroform, but difficultly soluble in petroleum-benzin and water. Its salicylate is readily crystallizable in the form of colorless crystals, which melt at from 138° to 142° C. and are readily soluble in alcohol and benzene but are more difficultly soluble in ether and very difficultly soluble in petroleum-benzin.

Having thus described my invention, what I claim is:

1. The process of producing acidyl esters of hydrocinchona alkaloids which comprises reducing the corresponding acidyl esters of the cinchona alkaloids with hydrogen in the presence of a catalytic metal of the platinum group.

2. The process of producing acidyl esters of hydrocinchona alkaloids which comprises reducing the corresponding acidyl esters of the cinchona alkaloids with hydrogen in the presence of a colloidal solution of a catalytic metal of the platinum group.

3. The process of producing carbonates of hydrocinchona alkaloids which comprises reducing the corresponding carbonates of the cinchona alkaloids with hydrogen in the presence of a catalytic metal of the platinum group.

4. The process of producing carbonates of hydrocinchona alkaloids which comprises reducing the corresponding carbonates of the cinchona alkaloids with hydrogen in the presence of a colloidal solution of a metal of the platinum group.

5. The process of producing carbonates of hydroquinin which comprises reducing the corresponding carbonates of quinin with hydrogen in the presence of a catalytic metal of the platinum group.

6. The process of producing carbonates of hydroquinin which comprises reducing the corresponding carbonates of quinin with hydrogen in the presence of a colloidal solution of a metal of the platinum group.

7. The process of producing alkyl carbonates of hydrocinchona alkaloids which comprises reducing the corresponding alkyl carbonates of the cinchona alkaloids with hydrogen in the presence of a catalytic metal of the platinum group.

8. The process of producing alkyl carbonates of hydroquinin which comprises reducing the corresponding alkyl carbonates of quinin with hydrogen in the presence of a catalytic metal of the platinum group.

9. As new products the herein described carbonates of the hydrocinchona alkaloids, being colorless and tasteless bodies, readily soluble in alcohol and chloroform but difficultly soluble in petroleum benzin and water.

10. As new products the herein described carbonates of hydroquinin, being colorless and tasteless bodies, readily soluble in alcohol and chloroform but difficultly soluble in petroleum benzin and water.

11. As new products the herein described alkyl carbonates of the hydrocinchona alkaloids, being colorless and tasteless bodies, readily soluble in alcohol and chloroform but difficultly soluble in petroleum benzin and water.

12. As new products the herein described alkyl carbonates of hydroquinin, being colorless and tasteless bodies, readily soluble in alcohol and chloroform but difficultly soluble in petroleum benzin and water.

13. As new products the ethyl carbonates of the hydrocinchona alkaloids, being colorless and tasteless bodies, readily soluble in alcohol and chloroform but difficultly soluble in petroleum benzin and water.

14. As a new product the ethyl carbonate of hydroquinin, forming fine colorless and almost tasteless crystals melting at 75 to 78° C., readily soluble in alcohol and chloroform but difficultly soluble in petroleum benzin and water.

In testimony whereof I affix my signature in presence of two witnesses.

HEINRICH THRON.

Witnesses:
JEAN GRUND,
CARL GRUND.